Patented May 12, 1942

2,282,791

UNITED STATES PATENT OFFICE 2,282,791

STABILIZATION OF FISH AND SIMILAR OILS

Sidney Musher, New York, N. Y., assignor to Musher Foundation Incorporated, New York, N. Y., a corporation of New York No Drawing. Application April 23, 1940, Serial No. 331,178

13 Claims. (Cl. 260—428)

The present invention relates to retarding oxidation, rancidity and loss of vitamin A content of the unsaturated fish oils, particularly high vitamin containing fish liver and fish oils.

It is well recognized that the unsaturated fish oils containing large amounts of vitamin A are readily subject to oxidative deterioration, rancidity and loss of vitamins.

An object of the present invention is the preservation of such oils against oxidation by simple and economical means and without the addition of foreign substances to the oils.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In the process commonly known as deodorization to which vegetable and animal oils and fats are subjected in the course of their processing, superheated steam is blown through the oils while they are held at an elevated temperature and the superheated steam removes objectionable odors and renders the finished oil more palatable.

At the same time, however, by subjecting the oils to deodorization, they are rendered much less stable than where not subjected to the deodorization treatment. For example, when it is desired to hold cottonseed oil over long periods of time, the cottonseed oil is stored in its undeodorized condition for as soon as the cottonseed oil has been deodorized by blowing superheated steam through the oil at a temperature of, for example, between 400° F. and 425° F., the oil is very much more subject to oxidative deterioration and to rancidity.

In accordance with the present invention, it has surprisingly been found that where the fish liver oils such as cod liver oil, halibut liver oil and tuna fish liver oil are subjected to a dry heating, preferably in the absence of air or under an atmosphere of inert gas such as nitrogen or carbon dioxide, the dry heat treated oil is rendered very much more stable and much more resistant to oxidative deterioration than the unheated oil.

The fish liver oil should be subjected to a temperature of at least about 240° F. to 250° F. and preferably to between about 275° F. and 375° F. for a period of from about 30 seconds to 5 or 10 minutes or more.

One satisfactory means for accomplishing the results of the present invention is to pass the cod liver oil through a coiled tubing freed of any entrained air. The tubing is held in a heated oil bath maintained at the desired temperature. By adjusting the flow of the oil through the coiled tubing, the oil will be heated to the desired temperature and for the desired period of time. The oil may then be cooled or allowed to cool, preferably under an atmosphere of inert gas, leaving the resultant oil in a highly stabilized condition.

It is not known as to just how this stabilizing effect is obtained at the elevated temperature. Where, for example, cod liver oil is incubated at 125° F. to 150° F., the development of rancidity occurs very much more rapidly than when the cod liver oil is held at lower temperatures. The increased antioxygenic effect of the present invention is particularly surprising in view of the well recognized and accepted fact that glyceride oils when subjected to an elevated temperature as in the course of deodorization with superheated steam blown through the oils tend to become more subject to rancidity and much less stable.

Apparently some reaction occurs between the oil soluble phosphatide and the oil soluble proteins removed in the rendering of the fish liver oils when they are subjected to the dry heating treatment to produce the anti-oxygenic effect.

Example I

Freshly rendered cod liver oil was divided into two lots. One lot was untreated and the other lot was heated under an atmosphere of carbon dioxide to 300° F. for about 1 minute and then cooled. Measured amounts of both lots were taken up on cotton and placed in an incubator at 125° F. Peroxide numbers were run daily on the extracted fat with the following results:

|  | Peroxide numbers after— | | | |
| --- | --- | --- | --- | --- |
|  | 0 day | 1 day | 2 days | 3 days |
| Untreated cod liver oil | 7.0 | 35.6 | 155 | 275 |
| Heated cod liver oil | 7.0 | 8.5 | 22.3 | 44 |

It is evident from the above experiment that there is a very marked stabilization against oxidative deterioration by subjecting the cod liver oil to a dry heating at the temperature of 300° F.

A further enhanced stabilization may also be obtained by adding to the cod liver oil relatively small proportions of phosphatides and proteins or amino acids or amine compounds followed by dry heating. Small amounts of fish meal in substantially dehydrated form or combinations of fish meal with lecithin also give a similar effect when added to glyceride oils followed by heating to over 250° F., and the glyceride oils are heated in substantially dry conditions and by the use of dry heat.

Where, for example, 1% of a fatty fish meal is added to cod liver oil and the oil then heated to a temperature of over 250° F. a further enhanced stabilization is obtained or the fish liver oil may be prepared in such a way as to entrain small amounts of the protein and phosphatide containing fish materials from which the fish liver oils are extracted.

The protein or amine compounds which are removed with the fish or fish liver oil together with the phosphatides appear to react with the glycerides at the elevated temperature during the dry heat treatment to produce the enhanced stabilization. This stabilization particularly occurs where the fish livers are subjected to a "rotting" or partial decomposition process in order to free more of the amine or protein compounds and render such compounds more readily soluble and removed in the oil with phosphatides during the rendering process followed by the dry heating.

In the same way that the fish liver oils may be stabilized in accordance with the present invention, the fish body oils may similarly be stabilized such as sardine oil, salmon oil, tuna fish oil, herring oil, mackerel oil and menhaden oil.

The phosphatide and proteins or amine compounds are similarly removed along with the fish oils during the rendering process and when these oils are subjected to a dry heating in excess of about 250° F., enhanced stabilization takes place.

Where additional finely divided dried fish meals containing both the proteins or amine compounds together with the phosphatides are added to the fish oils in order to further enhance the stabilization effect, the fish meal is added in an amount of between about 0.1% and 5% against the total weight of the oil and while the meal is thoroughly dispersed throughout the oil, the combination is subjected to in excess of about 250° F.

The fish liver or fish body oils should not be subjected to a causticizing process to remove or reduce the free fatty acids before subjecting those oils to the 250° F. dry heat treatment in order to obtain the desirable results of the present invention.

It has moreover been found that where the unsaponifiable fraction of these oils and particularly of the fish and fish liver oils is removed as in the preparation of vitamin concentrates from the unsaponifiable fraction, such vitamin concentrates also show an enhanced stabilization with respect to holding the vitamin content.

The heat treatment to which the oils are subjected is carried out desirably at not in excess of about 375° F. and preferably not in excess of 350° F.

Moreover, the heat treatment is conducted out of contact with oxygen or air and preferably under an atmosphere of an inert gas. An atmosphere of inert gas maintained at atmospheric pressure has been found most desirable for use in accordance with the present invention.

Among other glyceride oils which may, less preferably, be subjected to a dry heat treatment in order to produce improved stabilization are included the substantially unsaturated expressed vegetable glyceride oils. These oils must not have been subjected to any causticizing process and they are heated in their substantially crude and unrefined condition, the heat treatment being conducted without the use of superheated steam.

For example, particularly such oils as expressed, uncausticated and substantially unsaturated cottonseed oil, wheat germ oil, oat oil, alfalfa seed oil, sesame oil, soya bean oil and olive oil may be subjected to a dry heat treatment desirably under an inert gas and at a temperature in excess of about 250° F. for a momentary period or up to about 5 to 10 minutes and the oil will be rendered more stable with respect to oxidative deterioration.

It is not believed that these vegetable oils contain any substantial proportion of proteins and phosphatides as are contained in the fish oils but apparently some reaction occurs between the constituents of the oils and the glyceride oils themselves whereby some improved keeping quality is obtained.

Surprisingly, the results of the present invention are not obtained when the animal fats such as lard are subjected to the dry heat treatment.

During the dry heat treatment outlined above, substantially no portion of the oil is removed therefrom and the stabilized, dry heat treated oil produced in accordance with the present invention contains the same amount of constituent materials as was present before the dry heat treatment.

Having described my invention, what I claim is:

1. A method of stabilizing cod liver oils containing their normal complements of protein and phosphatide bodies removed with the rendering of the cod liver oils which comprises subjecting such oils to a dry heat treatment of at least about 250° F. and not in excess of about 375° F. whereby enhanced stabilization against rancidity and oxidative deterioration is obtained.

2. A method of stabilizing fish liver oils containing their normal complements of protein and phosphatide bodies removed with the rendering of the fish liver oils which comprises subjecting such oils to a dry heat treatment of at least about 250° F. and not in excess of about 375° F. whereby enhanced stabilization against rancidity and oxidative deterioration is obtained.

3. A method of stabilizing fish oils containing their normal complements of protein and phosphatide bodies removed with the rendering of the fish oils which comprises subjecting such oils to a dry heat treatment of at least about 250° F. and not in excess of about 375° F. whereby enhanced stabilization against rancidity and oxidative deterioration is obtained.

4. A method of stabilizing substantially unrefined and uncausticized glyceride oils selected from the group consisting of the fish oils and the vegetable oils, said glyceride oils being in substantially unsaturated condition, which comprises subjecting such oils to a dry heat treatment of at least about 250° F. and not in excess of about 375° F. whereby enhanced stabilization against rancidity and oxidative deterioration is obtained.

5. A process of treating an uncausticized crude unsaturated glyceride oil selected from the group consisting of the fish oils and the vegetable oils, which comprises subjecting it in an inert atmosphere to a dry heat above 250° F. and not in excess of about 375° F.

6. A process of treating an uncausticized crude unsaturated fish oil which comprises subjecting it in an inert atmosphere to a dry heat above 250° F. and not in excess of about 375° F.

7. A process of treating an uncausticized crude unsaturated vegetable oil which comprises subjecting it in an inert atmosphere to a dry heat above 250° F. and not in excess of about 375° F.

8. The process of refining the soybean oil which comprises heating the crude oil in an inert atmosphere to a temperature of between 250° F. and 375° F. for not more than about ten minutes.

9. A process of treating crude fish oils, which comprises heating such oils to between 250° F. and 375° F. under an atmosphere of an inert gas.

10. A process of treating crude fish liver oils, which comprises heating such oils to between 250° F. and 375° F.

11. A process of treating crude cod liver oils which comprises heating such oils to between 250° F. and 375° F.

12. A method of producing a highly stable vitamin concentrate, which comprises heating crude vitamin containing fish oils to between 250° F. and 375° F. under an inert gas and then removing the unsaponifiable fraction thereof.

13. The process of refining soybean oil which comprises subjecting the crude oil to a temperature between 250° F. and 375° F. in an inert atmosphere for a brief period of time.

SIDNEY MUSHER.